United States Patent [19]
Ho et al.

[11] Patent Number: 5,319,763
[45] Date of Patent: Jun. 7, 1994

[54] DATA PROCESSOR WITH CONCURRENT STATIC AND DYNAMIC MASKING OF OPERAND INFORMATION AND METHOD THEREFOR

[75] Inventors: Yui K. Ho, Austin; William C. Moyer, Dripping Springs; Joseph A. Gutierrez, Austin, all of Tex.

[73] Assignee: Motorola, Inc., Schaumburg, Ill.

[21] Appl. No.: 679,463

[22] Filed: Apr. 2, 1991

[51] Int. Cl.⁵ .................... G06F 9/22; G06F 9/26; G06F 11/18; G06F 13/30
[52] U.S. Cl. .................... 395/425; 364/264.1; 364/259.7; 364/259.5; 364/259.6; 364/259.1; 364/258.1; 364/259.9; 364/261.5; 364/267; 364/267.91
[58] Field of Search ............... 395/800, 250, 275, 325, 395/375, 400, 425, 500, 550, 575, 200, 700, 775, 725; 340/825.5; 364/DIG. 1, DIG. 2

[56] References Cited
U.S. PATENT DOCUMENTS

| | | | |
|---|---|---|---|
| 4,450,365 | 5/1984 | Hoff, Jr. et al. ................ | 395/250 |
| 4,453,229 | 6/1984 | Schaire ........................... | 395/250 |
| 4,546,428 | 10/1985 | Morton ........................... | 395/800 |
| 4,734,909 | 3/1988 | Bennett et al. .................. | 340/825.5 |
| 5,239,642 | 8/1993 | Gutierrez et al. ............... | 395/425 |

*Primary Examiner*—Alyssa H. Bowler
*Assistant Examiner*—Daniel H. Pan
*Attorney, Agent, or Firm*—Elizabeth A. Apperley

[57] ABSTRACT

A data processing system (10) implements a static and a dynamic masking operation of operand information concurrently. A static mask implements a conditional mask of a predetermined number of bits specified by the user and is determined prior to a comparison operation between the breakpoint address stored in a breakpoint register (24) and a logical address transferred via a logical address bus (11). A dynamic mask value implements a variable mask which allows the data processing system to mask the breakpoint address according to the size of a breakpoint address access. The static mask value and the dynamic mask value are concurrently implemented using a specialized bit cell (60) contained in both the breakpoint register (24) and the CAM array (26). The specialized bit cell (60) is comprised of two transistors (62 and 64) to concurrently mask a respective bit of operand information during a comparison operation.

17 Claims, 4 Drawing Sheets

DATA PROCESSOR WITH CONCURRENT STATIC AND DYNAMIC MASKING OF OPERAND INFORMATION AND METHOD THEREFOR

CROSS REFERENCE TO RELATED APPLICATION

This application is related to our commonly assigned copending patent applications filed simultaneously herewith and entitled:
1. "A DATA PROCESSOR WITH COMBINED STATIC AND DYNAMIC MASKING OF OPERAND INFORMATION" by Moyer et al., Ser. No. 07/679,478, and
2. "A DATA PROCESSOR WITH SHARED CONTROL AND DRIVE CIRCUITRY FOR BOTH BREAKPOINT AND CONTENT ADDRESSABLE STORAGE DEVICES" by Gutierrez et al., Ser. No. 07/679,477, now U.S. Pat. No. 5,239,642.

FIELD OF THE INVENTION

This invention relates generally to data processors, and more particularly, to masking of operand information used by data processors.

BACKGROUND OF THE INVENTION

During development of a software program in a data processing system, numerous techniques are often implemented to analyze the functionality and efficiency of the software program. A commonly used technique inserts a breakpoint in the software program to signal the data processing system to interrupt current execution of the software program at a predetermined address typically referred to as a breakpoint address. The breakpoint address is defined by the user of the data processing system and stored in a breakpoint register. The breakpoint register generally receives an address from an address bus and then compares the address with the contents of the breakpoint register. If the received address and a breakpoint address or a breakpoint address range stored in the breakpoint register match, a signal is sent to a central processing unit in the data processing system and an exception processing routine specified by the user of the data processing system is typically executed. In the exception processing routine, the user may specify that the internal registers of the data processor be displayed every time a breakpoint signal is encountered.

In some cases, the user of the data processing system uses a masking operation to exclude certain bits of the breakpoint address from participating in a comparison operation between an address on an address bus and the contents of the breakpoint register. Generally, a masking operation prevents predetermined bits of an operand from participating in a subsequent data processing function. In a typical data processing system, either a static or a dynamic mask is used during a masking operation. A static mask is typically defined by the user of the data processing system and implemented before the comparison operation between the address and the contents of the breakpoint register occurs. A static mask is generally a conditional mask which prevents predetermined bits of a breakpoint address from participating in the comparison operation.

In comparison, a dynamic mask is defined and implemented at the same point in time that the comparison operation occurs. Typically, the value of a dynamic mask is modified to variably match the size of an access to the breakpoint address. The size of an access may vary from a byte to a quadword.

Data processing systems designs typically implement either static or dynamic masking operations. A static mask function allows the user of a data processing system to conditionally mask certain bits in a breakpoint address. A dynamic mask function, however, allows for greater flexibility and efficiency during a breakpoint operation. Circuit complexities and area limitations are typically associated with any increase in the previously discussed masking functionality. As well, the execution time associated with implementing masking operations may significantly increase system overhead. Therefore, a system designer must typically choose between either a static or dynamic address masking mechanism.

SUMMARY OF THE INVENTION

The previously mentioned needs are fulfilled with the present invention. Accordingly, there is provided, in one form, a data processing system with concurrent and independent static and dynamic masking of information in an operand. The data processing system is comprised of a processing unit which provides the operand in response to instruction execution. The processing unit also provides first and second control signals which have been independently derived. The first control signal has static mask information defined prior to the instruction execution and the second control signal has dynamic mask information derived from a first portion of the operand. The data processing system is also comprised of a driver means. The driver means receives the first and second control signals and selectively provides both a static mask value and a dynamic maskable information value. The maskable information value is formed by combining the operand and dynamic mask information of the second control signal to dynamically mask a second portion of the operand. The data processing system is comprised of a controlled storage means coupled to the driver means. The controlled storage means contains coincidence values and selectively provides a coincidence match signal indicates whether the dynamic maskable information value was previously stored in the controlled storage means. The controlled storage means receives the static mask information signal and selectively masks a third portion of the operand concurrent with the generation of the coincidence match signal. These and other features, and advantages, will be more clearly understood from the following detailed description taken in conjunction with the accompanying drawings.

DETAILED DESCRIPTION OF A PREFERRED EMBODIMENT

In a data processing system, a content addressable memory (CAM) is a memory wherein a stored element is identified on the basis of data content rather than on storage address location. A CAM is typically formed of CAM cells arranged in rows and columns to form an array. In a traditional CAM array architecture, information is generally accessed simultaneously and in parallel to provide a data processing system which completes a large number of operations in a relatively short amount of time. The unique architecture of the CAM array has found applications in many data processing systems. For example, the parallel processing of the CAM array enables a significant amount of data from memory to be retrieved from a data processing system in less time than a conventional memory implementation. In more advanced applications in which the CAM array is used as an Address Translation Cache (ATC), the CAM array also enables the user to allocate, control, and access portions of a memory space in the data processing system.

As described herein, a CAM array is integrated with a logic circuit which executes a breakpoint operation. A breakpoint operation commonly signals a data processing system to interrupt current execution of a software program at a predetermined address in the program. The predetermined address is generally referred to as a breakpoint address. In a data processing system, a value of a breakpoint address is typically defined by the user and stored in a breakpoint register. If an address on an address bus and the breakpoint address or breakpoint address range stored in the breakpoint register match, a breakpoint signal is sent to a central processing unit in the data processing system to execute an exception processing routine associated with the breakpoint function. For example, the user of the system may specify that the exception processing routine display the internal registers of the data processor every time a breakpoint signal is encountered.

In some cases, the user of a system may use a masking operation to exclude certain bits from a comparison operation between the address on the address bus and the breakpoint address. A static mask is defined and implemented before the comparison operation occurs. A dynamic mask is defined and implemented at the same point in time that the comparison operation occurs. The invention described herein implements both static and dynamic masking operations during a breakpoint operation.

Figure 1:
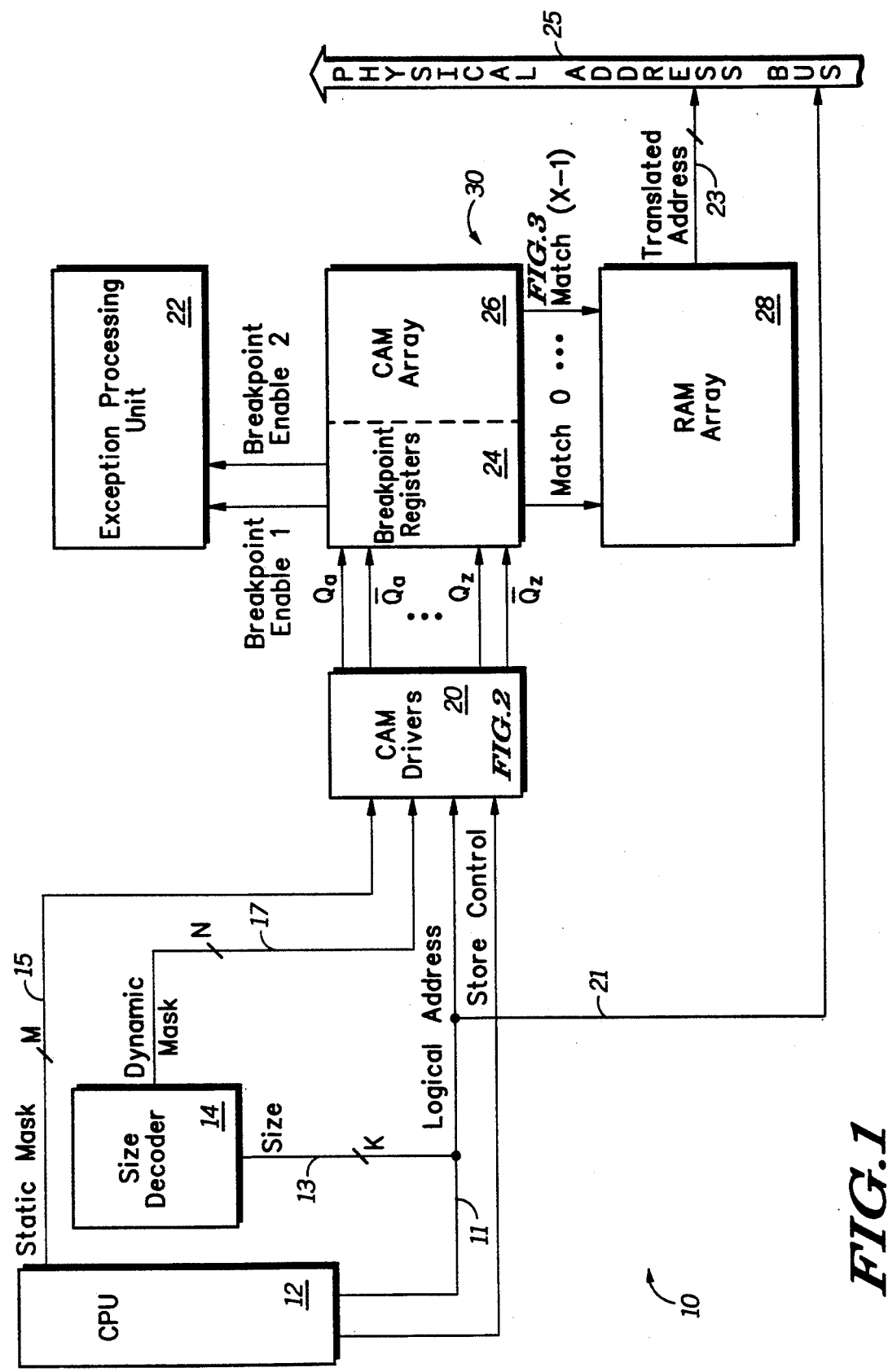
FIG. 1 illustrates in partial block diagram form a data processor having concurrent static and dynamic breakpoint capability in accordance with the present invention.

Illustrated in FIG. 1 is a block diagram of a data processing system 10 with shared control and drive circuitry for a content addressable storage device and a breakpoint device. The breakpoint device may be both statically and dynamically masked. The data processing system 10 generally has a central processing unit (CPU) 12, a size decoder 14, a plurality of content addressable memory (CAM) drivers 20, an exception processing unit 22, a plurality of breakpoint registers 24, a CAM array 26, and a random access memory (RAM) array 28. The CAM array 26 and the RAM array 28 are collectively referred to as an "Address Translation Cache" (ATC) 30.

The CPU 12 provides a plurality of input signals to the size decoder 14 via a Size bus 13. The Size bus 13 is K bits wide, where K is an integer. In the illustrated embodiment of the invention, the information transferred by the Size bus 13 is an encoded value of a dynamic mask which indicates the size of an access of either a breakpoint address value stored in the breakpoint registers 24 or an address value stored in the CAM array 26. Both address values are generally determined by the user of the data processing system 10 and may be accessed in a variety of sizes which include byte, half-word, word, double-word, and quad-word lengths.

An example of an implementation of a dynamic mask in a plurality of typical breakpoint registers is explained in the following example. The dynamic mask would be similarly implemented in CAM array 26. During operation of a data processing system, each address value transferred from CPU 12 by logical address bus 11 is compared with each one of the breakpoint address values stored in the plurality of breakpoint registers. Since each address value corresponds to a byte of information, a byte may be accessed at any address location. However, a half-word address access requires two bytes of information. The half-word address may only be accessed at hexadecimal address $0 and other hexadecimal addresses which are multiples of two, such as $2, $4, and $6. Likewise, a word address access requires four bytes of information. Similarly, a word address value may be accessed at hexadecimal address $0 and other hexadecimal addresses which are multiples of four, such as $4 and $8. Assume that the user of the data processing system 10 has stored a breakpoint address value $5 in one of the breakpoint registers. If a byte access is performed, a match between the breakpoint address value and the logical address may only be obtained if address $5 is accessed. If a half-word access is performed, a match is observed if address $4 is accessed. If address $5 is accessed, a match occurs, but boundaries of the addresses determine that the half-word access should begin at address $4, rather than providing a half-word access from address $5 to address $6. Likewise, if a word access is performed, a match is observed if one of address $4, address $5, address $6, or address $7 is accessed.

A plurality of N output signals of the size decoder 14 indicates which bits in a breakpoint address should be masked to implement the dynamic masking function described above. The size decoder 14 decodes the K input signals to the plurality of N output signals, where N is an integer. Each one of the plurality of N output signals of the size decoder 14 is connected to a first input of one of the plurality of CAM drivers 20 via a bus labelled "Dynamic Mask" which is N bits wide.

An example of the decode operation implemented by the Size Decoder 14 is illustrated in the following table. Assume that K equals three and N equals four such that the size decoder 14 has three input signals and four output signals.

| Access Size | Size Signal | Dynamic Mask Signal |
| --- | --- | --- |
| Double Word | 000 | 0111 |
| Half Word | 001 | 0001 |
| Word | 010 | 0011 |
| Byte | 011 | 0000 |
| Quad | 1XX | 1111 |

Assume that the user of the data processing system 10 accesses a byte of an address value. The encoded Size signal has a binary value of 011 which translates to a binary dynamic mask value of 0000. Typically, a mask bit value of one prevents the corresponding address bit from participating in a comparison operation. In this case, no bits have a value of one in the dynamic mask value. Therefore, all bits of the breakpoint address stored in the breakpoint register are compared to the address on the address bus. Because each breakpoint register address stores a byte of information, all bits should be examined during a comparison operation. On the other hand, if the user of the system accessed a word of information, the Size signal would have a binary value of 010 and the corresponding Mask signal would have a binary value of 0011. In this example, the lower two bits have a value of one and are, therefore, effectively disabled from participating in the comparison process between the current address on the address bus and the breakpoint address. Because the lower two bits of the corresponding address are prevented from participating in the comparison operation, a word of the breakpoint address is effectively masked.

A static mask may also be implemented in the data processing system 10. As stated above, the static mask must be determined by the user of the data processing system prior to the access of the address stored in the breakpoint register. The value of each bit of the static mask signal is provided by the CPU 12 via a bus labelled "Static Mask" which is M bits wide, where M is an integer. Each bit of the static mask signal is connected to a second input of each one of the plurality of CAM drivers 20 by the Static Mask bus 15.

Each bit of a logical address is connected to a third input signal of each one of the plurality of CAM drivers 20 by a Logical Address bus 11. The plurality of CAM drivers 20 serves as a buffer between an address on the Logical Address bus 11 and both the plurality of breakpoint registers 24 and the CAM array 26.

The CPU 12 provides a signal labelled "Store Control" to a fourth input of each one of the plurality of CAM drivers 20. The Store Control signal is a control input which indicates whether or not information is currently being stored to either the plurality of breakpoint registers 24 or the CAM array 26. Additionally, an electrical ground signal is connected to a fifth input of each one of the plurality of CAM drivers 20.

Figure 2:
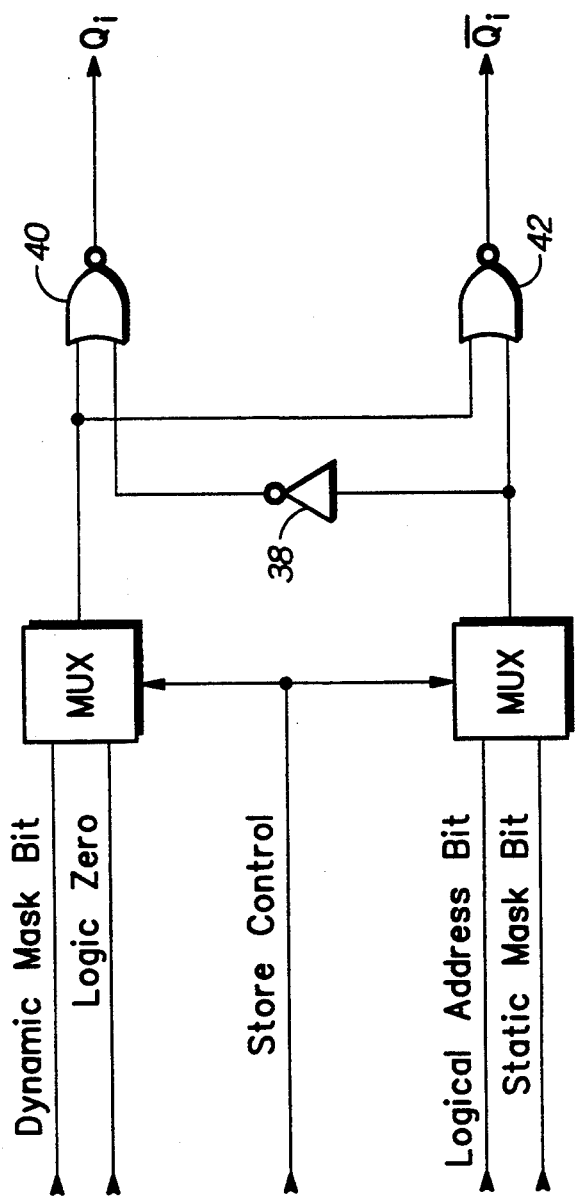
FIG. 2 illustrates in logic diagram form one of a plurality of CAM drivers as illustrated in FIG. 1.

FIG. 2 illustrates the logic circuitry of one of the plurality of CAM drivers 20. A single bit of the dynamic mask signal is connected to a first input of a first Multiplexer 32 in each respective one of the plurality of CAM drivers 20. The electrical ground signal provides a second input to the first Multiplexer 32. The Store Control signal provides a control input to both the first Multiplexer 32 and the second Multiplexer 34. A single bit of the logical address is connected to a first input of a second Multiplexer 34. A second input of the second Multiplexer 34 is provided by a single bit of the static mask signal. The first Multiplexer 32 and the second Multiplexer 34 allow only a single one of the input signals to propagate to a remaining portion of logic circuitry depending on the value of the Store Control signal.

An output signal provided by Multiplexer 32 provides a first input to both a NOR gate 42 and a NOR gate 40. An output signal provided by Multiplexer 34 provides a first input to an inverter 38 and a second input to NOR gate 42. An output of inverter 38 is connected to a second input of a NOR gate 40. An output of NOR gate 40 is a signal labelled "Qi" and an output of NOR gate 42 is a signal labelled "Q̄i". The Qi and the Q̄i signals provide inputs to both the breakpoint registers 24 and the CAM array 26 and are respectively referred to as bit line and inverse bit line signals. The Qi signal is one of Y output signals of CAM drivers 20, where Y is an integer.

The operation of the plurality of CAM drivers 20 is illustrated in the following example. If the user of the data processing system 10 determines that static mask information should be stored in either the breakpoint registers 24 or the CAM array 26, the Store Control signal is asserted with a logical value of one. The first Multiplexer 32 allows the electrical ground signal to propagate to the first input of both the NOR gate 40 and the NOR gate 42. The second Multiplexer 34 allows a bit of the Static Mask signal to propagate to a first input of inverter 38 and a second input of NOR gate 42. The output of NOR gate 40 then reflects the value of the static mask bit and the output of NOR gate 42 reflects the inverse value of the static mask bit. Subsequently, the value of the static mask bit is stored in a corresponding bit cell (not shown in FIG. 2) of either the breakpoint register 24 or the CAM array 26. If the Store Control signal is not asserted and has a logical value of zero, the first Multiplexer 32 allows a bit of the dynamic mask signal to propagate to the first input of both NOR gate 40 and NOR gate 42. The second Multiplexer 34 then allows a bit of the Logical Address signal to propagate to a first input of inverter 38 and a second input of NOR gate 40. If the value of the Dynamic Mask bit is zero, the value of the logical address bit is output by NOR gate 40 and the inverse value of the logical address bit is output by NOR gate 42. The plurality of CAM drivers 20 then serves as a buffer between an address on the Logical Address bus 11 and both the plurality of breakpoint registers 24 and the CAM array 26.

If the value of the dynamic mask bit is one, however, both of the output signals provided by both NOR gate 40 and NOR gate 42 are zero. When a bit of the Dynamic Mask signal has a binary value of one, both the Qi and the Q̄i signals have a value of zero. A zero on both signals effectively masks data and prevents the information stored at a corresponding location in the breakpoint register 24 or the CAM array 26 from participating in an operation specified by the user of a data processing system 10. A zero on both signals masks the information of the corresponding location.

Figure 3:
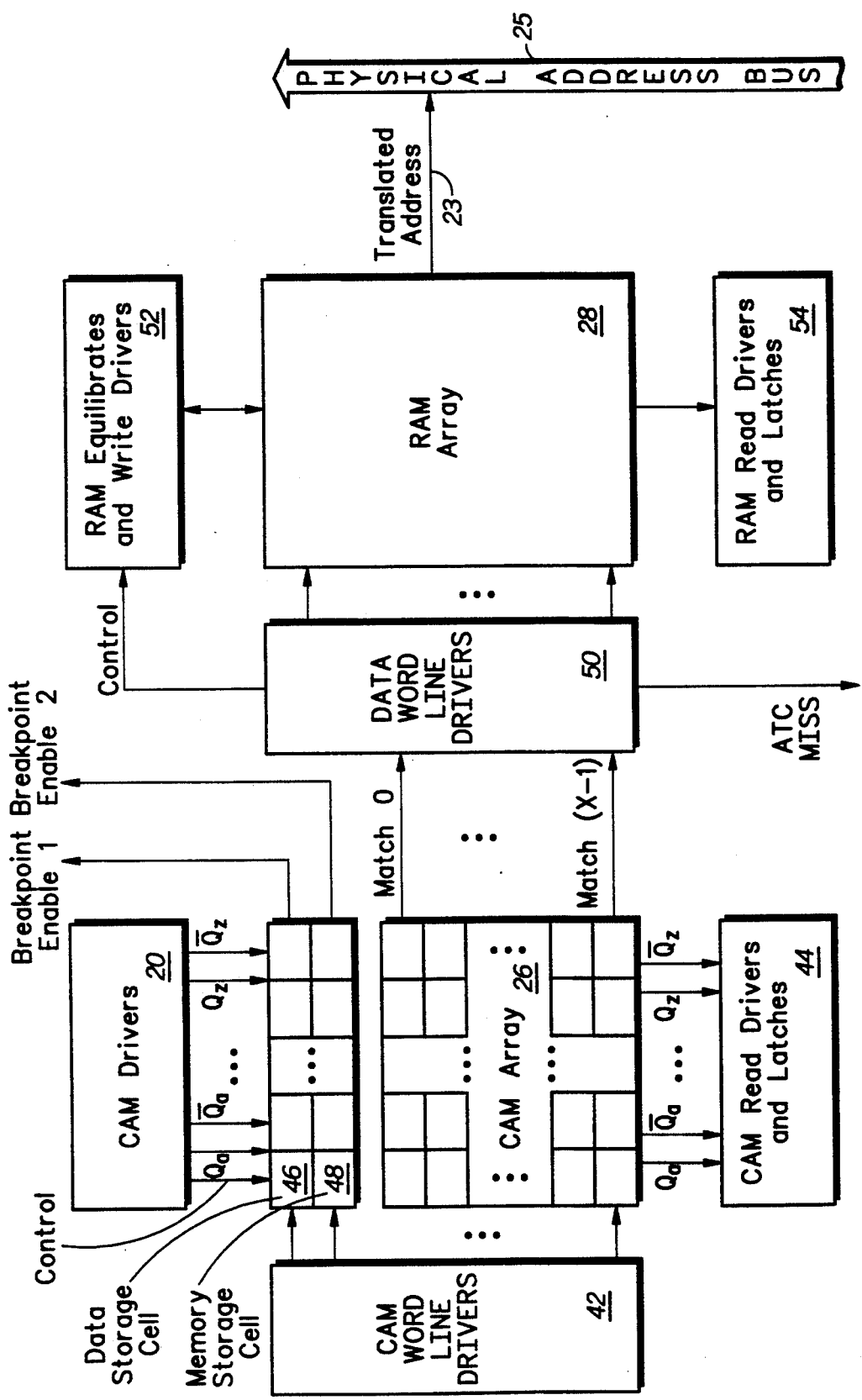
FIG. 3 illustrates in block diagram form an Address Translation Cache as illustrated in FIG. 1.

The structure of the breakpoint register 24 and the ATC 30 is illustrated in greater detail in FIG. 3. The ATC 30 is formed by the CAM array 26 and the RAM array 28. The breakpoint register 24 and the CAM array 26 are generally comprised of a plurality of bit cells 60 arranged in A rows and Y columns, where both A and Y are integers. Each of the bit cells 60 is a specialized CAM cell which is maskable (not shown). The plurality of output signals from the plurality of CAM Drivers 20, labelled as "Q(a-z)" and "Q(a-z)", provide a first plurality of bit line and inverse bit line input signals to both the breakpoint registers 24 and the CAM array 26. The plurality of CAM Drivers 20 also provides a first control signal to the breakpoint registers 24 and the CAM array 26. The first control signal executes a function specified by the user of the data processing system 10.

A plurality of CAM Word Line Drivers 42 is coupled to a second input of each row of bit cells 60 in both the breakpoint registers 24 and the CAM array 26. The plurality of CAM Word Line Drivers 42 provide a signal labelled "Word Line". When the Word Line signal is enabled, information is written to or read from a corresponding row of information in the breakpoint registers 24 or the CAM array 26. The CAM Read Drivers and Latch 48 are connected to a first plurality of output signals of a column of the bit cells 60. The CAM Read Drivers and Latch 48 enable the column of bit cells 60 of the breakpoint registers 24 and the CAM Array 26 such that the information stored at the bit cells 60 may be read. The information is subsequently latched for future use as determined by the user of the data processing system 10.

Figure 4:
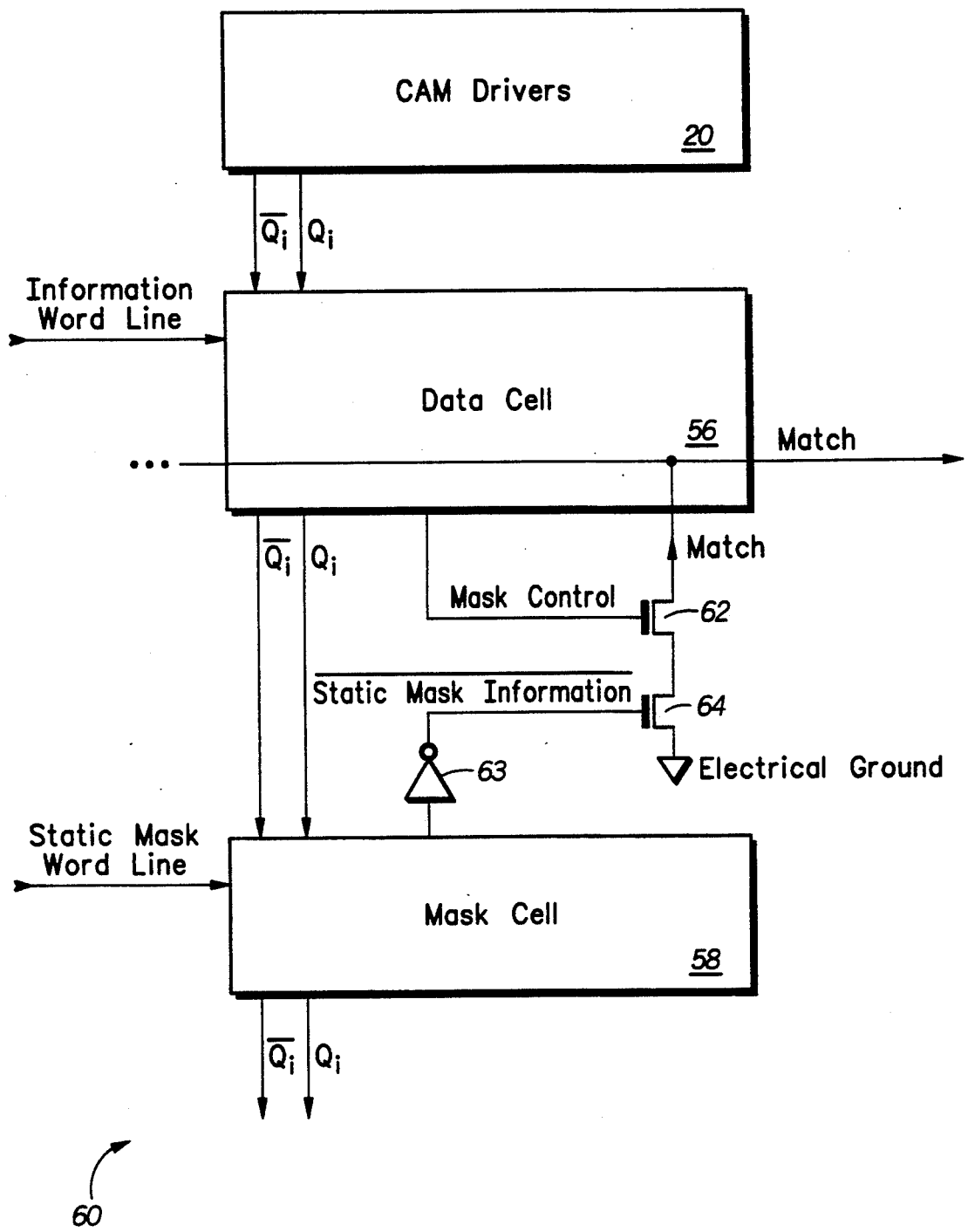
FIG. 4 illustrates in partial block diagram form one of a plurality of bit cells of the CAM array illustrated in FIG. 3.

As illustrated in FIG. 4, a bit cell 60 is comprised of a data cell 56 and a corresponding mask cell 58 in both the breakpoint register 24 and the CAM array 26. In one form of the invention, the data cell 56 is implemented as a standard CAM cell and the corresponding mask cell 58 is implemented as a standard RAM (Random Access Memory) cell. The CAM drivers 20 provide the Qi and $\overline{Qi}$ signals to a respective first and second input of the data cell 56. The Qi and $\overline{Qi}$ signals are one of the plurality of Q(a-z) and $\overline{Q}$(a-z) signals. The Qi and $\overline{Qi}$ signals provide data to be stored in the data cell 56 and information to be subsequently compared with the stored data. The stored data may also be referred to as a coincidence value. Additionally, if a bit cell 60 is enabled to be read, the information read from the bit cell 60 is provided via the Qi and $\overline{Qi}$ signals. A first control line labelled "Information Word Line" is connected to a first control input of the data cell 56. The Information Word line enables information to be written to or read from the data cell 56.

The data cell 56 functions as an Exclusive-OR gate during a comparison function. The information entered by the Qi signal is compared with information previously stored at data cell 56. If the Qi signal and the previously written information do not match, the data cell 56 asserts a first output signal labelled "Mask Control". If the Qi signal and the previously written information do match, the Mask Control signal is not asserted. A second output of data cell 56 is a signal labelled "Match" which is pre-charged to a logic value of one. The Match signal indicates to the user of the data processing system 10 that a match has occurred between the information currently entered to the data cell 56 and the previously stored contents of data cell 56 during a comparison operation.

The CAM drivers 20 also provide the Qi and $\overline{Qi}$ signals to a respective first and second input of the mask cell 58. The Qi and $\overline{Qi}$ signals provide data to be stored in the mask cell 58. Typically, the data stored in the mask cell 58 represents a bit of a predetermined static mask value. A first control line labelled "Static Mask Word Line" is connected to a first control input of the mask cell 58. The Static Mask Word line enables information to be written to or read from the mask cell 58. During a comparison operation, the mask cell 58 provides a signal labelled "Static Mask Information". The Static Mask Information signal indicates to the user of the data processing system 10 whether or not a respective bit of an address should be excluded from participating in the comparison operation.

The contents of the data cell 56 and the mask cell 58 are integrated by a first transistor 62 and a second transistor 64. The Mask Control signal provides an input to a control electrode and the Match signal provides an input to a first current electrode of the first transistor 62. A second current electrode of the first transistor 62 is connected to a first current electrode of the second transistor 64. A second current electrode of the second transistor 64 is connected to the electrical ground reference voltage. The Static Mask Information signal provides an input to an inverter 63. An output signal of the inverter 63 is connected to a first control electrode of the second transistor 64.

The structure of the bit cell 60 allows for concurrent static and dynamic masking of information in a data processing system. The dynamic mask information is introduced by the Qi and $\overline{Qi}$ signals and the static information is introduced by the Static Mask Information signal. During a single comparison operation, the static and dynamic masking functions are concurrently implemented.

For example, assume that a logic level of one on the Match signal indicates that a match has occurred between the information currently entered to the data cell 56 and the previously stored contents of data cell 56 during a comparison operation. If the information currently entered to the data cell 56 has been masked using a dynamic mask function, both the Qi and $\overline{Qi}$ signals will have a logical value of zero. When both the Qi and $\overline{Qi}$ signals have an identical logic value, the standard CAM cell comprising data cell 56 is effectively disabled. Therefore, the bit cell 56 could not affect the value of the Match signal and the Match signal would remain at a logic level of one.

In a similar case, assume that the information currently entered to the data cell 56 by the Qi and $\overline{Qi}$ signals has not been masked using a dynamic mask function. During a comparison operation, the data cell 56 functions as an Exclusive-OR gate. The information entered by the Qi signal is compared with information previously stored at data cell 56. If the Qi signal and the previously written information do not match, the data cell 56 asserts a first output signal labelled "Mask Control". The transistor 62 is, therefore, enabled. If the Qi signal and the previously written information do match, the data cell 56 does not assert the Mask Control signal and the transistor 62 is not enabled. Therefore, the Match signal remains a logic level of one and indicates that a match occurred to the user of the data processing system 10.

The Mask cell 58 concurrently provides a Static Mask Information signal to implement the static and dynamic mask information. If the respective bit of the static mask value is not set, the Static Mask Information signal has a value of zero. Subsequently, the output of the inverter 63 has a value of one. The output of the inverter 63 enables the transistor 64. If both transistor 62 and transistor 64 are concurrently enabled, the Match signal is pulled to an electrical ground level. The electrical ground level on the Match signal indicates that a match has occurred between the information currently entered to the data cell 56 and the previously stored contents of data cell 56 during a comparison operation. If the static mask value had been set, the Static Mask Information signal would have a value of one. Subsequently, the output of the inverter 63 would have a value of zero and the transistor 64 would not be enabled. The Match signal would remain at a logic level of one and would indicate that a match occurred.

The Match signal provided by bit cell 60 is one of a plurality of signals output by both the breakpoint register 24 and the CAM array 26 in response to a comparison operation. The breakpoint registers 24 provides two signals labelled "Breakpoint Enable 1" and "Breakpoint Enable 2" in response to the comparison operation. Each of the breakpoint enable signals indicates that one of the values stored in the contents of the breakpoint registers 24 is identical to a logical address or address range currently transferred by the Logical Address Bus 11.

The CAM array 26 provides X output signals labelled "Match 0" through "Match (X-1)" to a plurality of Data Word Line Drivers 42 in response to a comparison operation. A respective one of the Match 0 through Match (X-1) signals is asserted when a single stored word in the CAM array is identical to an address transferred by the CAM Drivers 20. The plurality of Data Word Line Drivers 42 is coupled to a plurality of first input signals of each row of the RAM array 28. The plurality of Data Word Line Drivers 42 serves as a buffer to select a predetermined row of information in the RAM array 28 and determines which row of the RAM array 28 should be asserted during an address translation function.

When a respective one of the Match 0 through Match (X-1) signals enables a single corresponding cell in the RAM array 28, the RAM array 28 provides a corresponding first portion of a physical address to a Physical Address Bus 25 via a Translated Address Bus 23. A second portion of the physical address is provided by transferring, without translation, a portion of the logical address to the Physical Address Bus 25 via a Lower Logical Address Bus 21. The two portions of the physical address are integrated to form an address signal which indicates the location of information within the data processing system 10.

For example, assume that a Logical Address signal coupled from Logical Address Bus 11 to the CAM array 26 is identical to a stored word in the CAM array 26. Subsequently, one of the plurality of Match 0 to Match (X-1) signals is asserted and a RAM array 28 location is selected. The address stored at the selected RAM array 28 location is output to the Physical Address Bus 25 via the Translated Address Bus 23 and provides a high order portion of a physical address transferred via the Physical Address Bus 25. A low order portion of the physical address transferred via the Physical Address Bus 25 is identical to a predetermined low order portion of the logical address transferred via the Logical Address Bus 11.

If a predetermined row of information in the RAM array 28 is not selected, an output signal labelled "ATC Miss" is asserted. The ATC Miss signal indicates that a location in the RAM array 28 could not be selected in accordance with an address specified by one of the plurality of Match 0 to Match (X-1) signals output by the CAM array 26. Subsequently, the ATC Miss signal is output to the data processing system 10 to indicate that an error occurred to the user of the system.

A plurality of RAM Equilibrates and Write Drivers 50 is connected to a second plurality of inputs to the RAM array 28. The plurality of RAM Equilibrates and Write Drivers 50 acts as a buffer and transfers information to first plurality of inputs of the RAM array 28. The plurality of RAM Equilibrates and Write Drivers 50 also provides a control signal to the RAM array 28. The control signal executes a function specified by the user of the data processing system 10. A plurality of RAM Read Drivers and Latches 52 are connected to a plurality of output signals of the RAM array 28. The plurality of RAM Read Drivers and Latches 52 enable the cells of the RAM Array 28 such that the information stored at the cells may be read. The information is subsequently latched for future use as determined by the user of the data processing system 10.

It should be well understood that the concurrent execution of both static and dynamic masking operations during both a breakpoint function and an address translation function enhances the flexibility and efficiency of a data processing system. The mask of the breakpoint address and the information entered to the CAM array 26 is effectively and quickly manipulated by the user of the data processing system with the addition of a small amount of external circuitry.

By now it should be apparent that there has been provided a data processor with shared control and drive circuitry for both a breakpoint device which may be concurrently statically and dynamically masked. There are many additional configurations for implementing the invention described above. The Size Decoder 14 may have any number of input signals and any number of output signals. As well, the dynamic mask value could be derived from control signals or from information other than the size of an address access. The implementation of the plurality of CAM drivers 20 may be accomplished in a different manner. For example, the Multiplexer 32 and the Multiplexer 34 might be comprised of any form of a logic circuit which accomplishes the function of enabling only a single signal in response to a control signal. The function implemented by the logic circuit illustrated in FIG. 2 could be executed using a circuit which accomplishes a similar function, but not necessarily identical to the illustrated logic circuit. The bit cell 60 used in the integrated breakpoint registers 24 and the CAM array 26 could be implemented using a variety of configurations. For example, a bit cell 60 which uses only a single bit line and not an inverse bit line to provide data could be easily used in the integrated breakpoint and content addressable storage device. In some cases, different data paths for loading and reading the integrated breakpoint and content addressable storage device might be used. The function of the bit cell 60 during a comparison operation could also be modified to reflect the needs of the user. For example, the Exclusive-OR function might be replaced with an AND gate. Additionally, the transistors 62 and 64 which allow the static and dynamic mask values to be concurrently executed could be implemented in any semiconductor fabrication procedure. The transistors 62 and 64 could be fabricated using a CMOS, MOS, Bipolar, or GaAs manufacturing process. The transistors 62 and 64 could also be replaced with another logic circuit. As well, in another form, the breakpoint signals output by the breakpoint registers when a match occurs between the breakpoint address and a current logical address value on the Logical Address bus 11 might be combined to one general breakpoint signal.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processor, comprising:
   a processing unit for providing an operand, a static mask signal and a dynamic mask signal in response to instruction execution, the static mask signal being defined prior to instruction execution and the dynamic mask signal being derived from a first portion of the operand;

driver means for selectively providing one of the static mask signal, the operand, and a dynamically masked signal, the driver means being coupled to the processing unit for receiving the operand, the static mask signal, and the dynamic mask signal; and a content addressable memory, comprising:

a plurality of data cells, each of the plurality of data cells storing a bit of a previously stored information value, each of the plurality of data cells comparing a bit of the operand to a corresponding bit of the previously stored information value and selectively asserting a match signal, each of the plurality of data cells providing a mask control signal, each of the plurality of data cells being coupled to the driver means for receiving the operand;

a plurality of mask cells, each of the plurality of mask cells selectively providing a bit of the static mask signal, each the plurality of mask cells being coupled to the driver means for receiving the static mask value; and logic means to concurrently statically and dynamically mask a bit of the operand, the logic means being coupled to each of the plurality of data cells to receive the match signal and the mask control signal, the logic means being coupled to each of the plurality of static mask cells for receiving the bit of the static mask value.

2. The data processor of claim 1 wherein the driver means provides the static mask signal when a first control signal is in a first logic state.

3. The data processor of claim 2 wherein the driver means provides the operand when the first control signal is in the second logic state and the dynamic mask signal is in the first logic state.

4. The data processor of claim 3 wherein the driver means provides the dynamically masked signal when both the first control signal and the dynamic mask signal are in the second logic state.

5. The data processor of claim 1 wherein the logic means further comprises:

a first transistor having a first current electrode coupled to the match signal, a control electrode coupled to the mask control signal, and a second current electrode;

a second transistor having a first current electrode coupled to the second current electrode of the first transistor, a control electrode, and a second current electrode coupled to a reference voltage terminal; and an inverter having an input coupled to the bit of the static mask value and an output coupled to the control electrode of the second transistor.

6. The data processor of claim 1 wherein the dynamic mask signal is derived from an encoded portion of an opcode of an instruction, the encoded portion of the opcode indicating a size of an access of information in the content addressable memory.

7. The data processor of claim 1 wherein the static mask signal is stored in the plurality of mask cells prior to instruction execution.

8. The data processor of claim 1 wherein the mask control signal is asserted when the driver means provides the dynamically masked signal with a predetermined logic value.

9. The data processor of claim 1 wherein the match signal is asserted when a corresponding bit of the operand is equal to the bit of the previously stored information value.

10. A method for implementing concurrent independent static and dynamic masking of operand information in a data processor, comprising the steps of:

initiating execution of an instruction in a processing unit;

generating an operand, a static mask signal and a dynamic mask signal in response to instruction execution using a plurality of driver circuits, the static mask signal being defined prior to instruction execution and the dynamic mask signal being derived from a first portion of the operand;

providing one of the static mask signal, the operand, and a dynamically masked signal to a content addressable memory;

enabling each of a plurality of data cells to compare a bit of the operand to a corresponding bit of an information value previously stored in each of the plurality of data cells;

asserting a match signal when the bit of the operand is equal to the corresponding bit of the information value, the match signal being asserted by each of the plurality of data cells;

enabling each of the plurality of data cells to provide a mask control signal in response to a corresponding bit of the dynamically masked value;

selectively enabling each of a plurality of mask cells to provide a bit of the static mask signal, each the plurality of mask cells being coupled to the driver means for receiving the static mask value; and concurrently statically and dynamically masking a bit of the operand using a logic means, the logic means being coupled to each of the plurality of data cells to receive the match signal and the mask control signal, the logic means being coupled to each of the plurality of static mask cells for receiving the bit of the static mask value.

11. The method of claim 10 further comprising the step of enabling the driver means to provide the static mask signal when a first control signal is in a first logic state.

12. The method of claim 11 further comprising the step of enabling the driver means to provide the operand when the first control signal is in the second logic state and the dynamic mask signal is in the first logic state.

13. The method of claim 12 further comprising the step of enabling the driver means to provide the dynamically masked signal when both the first control signal and the dynamic mask signal are in the second logic state.

14. The method of claim 10 further comprising the step of deriving the dynamic mask signal from an encoded portion of an opcode of an instruction, the encoded portion of the opcode indicating a size of an access of information in the content addressable memory.

15. The method of claim 10 further comprising the step of storing the static mask signal in the plurality of mask cells prior to instruction execution.

16. The method of claim 10 further comprising the step of asserting the mask control signal when the driver means provides the dynamically masked signal with a predetermined logic value.

17. The method of claim 10 further comprising the step of asserting the match signal when a corresponding bit of the operand is equal to the bit of the previously stored information value.

* * * * *